United States Patent [19]

Ropars et al.

[11] 3,994,862

[45] Nov. 30, 1976

[54] THERMOSETTING POLYMERS AND PREPOLYMERS AND A PROCESS FOR MAKING THEM BY POLYCONDENSATION OF A PYRIDINE HAVING AT LEAST THREE METHYL SUBSTITUANTS

[75] Inventors: Marcel P. Ropars; Bertrand M. Bloch, both of Paris, France

[73] Assignee: Office National d'Etudes et de Recherches Aerospatiales (O.N.E.R.A.), Chatillon-sous-Bagneux, France

[22] Filed: Feb. 6, 1975

[21] Appl. No.: 547,499

[30] Foreign Application Priority Data

Feb. 14, 1974 France .............................. 74.05065

[52] U.S. Cl. .............................. 260/67.5; 260/32.4; 260/32.6 N; 260/33.2 R; 260/33.4 R; 428/367; 428/902
[51] Int. Cl.$^2$ ..................... C08G 12/26; C08K 5/06; C08K 5/16; C08K 5/20
[58] Field of Search ............. 260/67.5, 32.6 N, 32.4, 260/33.2 R, 33.4 R, 33.8 N; 428/367, 902

[56] References Cited

UNITED STATES PATENTS

| | | | |
|---|---|---|---|
| 2,809,186 | 10/1957 | Smith et al. | 260/67.5 |
| 3,194,790 | 7/1965 | Brown | 260/67.5 |
| 3,329,677 | 7/1967 | Schumann | 260/67.5 |

*Primary Examiner*—J. Ziegler
*Attorney, Agent, or Firm*—Larson, Taylor and Hinds

[57] ABSTRACT

The thermosetting polymers and prepolymers of the invention are obtained by condensing a pyridine comprising at least three methyl groups, such as trimethyl-2,4,6 pyridine, with an aromatic dialdehyde, such as trephthalic aldehyde at a temperature ranging from about 150° to about 220° C. They can be shaped and set by maintaining the temperature between about 200° and about 300° C. They are suitable for making laminates.

22 Claims, No Drawings

THERMOSETTING POLYMERS AND PREPOLYMERS AND A PROCESS FOR MAKING THEM BY POLYCONDENSATION OF A PYRIDINE HAVING AT LEAST THREE METHYL SUBSTITUANTS

The invention relates to new thermosetting polymers derived from substituted pyridine, the preparation thereof and their uses.

Among substituted derivatives of pyridine, 2,6-dimethyl-pyridine or 2,6-lutidine have already been used in condensation reactions with an aromatic dialdehyde and, more specifically, terephthalic aldehyde. However, these reactions have not led to industrial processes since, in the absence of any control of their progression, they yielded directly a solid mass in the absence of any intermediate stage.

Underlying the present invention, the applicant has noticed, contrary to what could have been expected by analogy with the aforesaid known reaction, that the condensation of trimethyl-pyridine, especially trimethyl 2, 4, 6-pyridine or gamma-collidine, with an aromatic dialdehyde such as terephthalic aldehyde could be readily controlled and interrupted at any desired intermediate stage of the condensation, thus giving the possibility to obtain useful products suitable for industrial uses.

Accordingly, the invention has for its object new prepolymers consisting, at least in part, of polycondensation products of a pyridine bearing at least three methyl substituents and, in particular, a trimethylpyridine, with an aromatic dialdehyde. The preferred trimethyl-pyridine is 2, 4, 6-trimethyl- or gamma-collidine, which is especially advantageous from the point of view subsequent industrial uses. A further object of the invention are the polymers obtained by setting or cross-linking of said prepolymers.

In accordance with an essential advantage obtained by the present invention, the prepolymers are easy to prepare and to use. They may be obtained in various forms according to the desired degree of polycondensation, the latter being readily controllable. They can be in the form of viscous liquids or meltable solids providing thermosetting resins which may be used or shaped before complete hardening. After complete setting, these reins or prepolymers provide polymers which, in accordance with a further useful aspect of the invention, possess unic mechanical and thermal properties.

The prepolymers according to the invention can be prepared by a process which comprises reacting an at least trimethyl-pyridine with at least one aromatic dialdehyde. Preferably the latter is phthalic, isophthalic or terephthalic aldehyde. The use of terephthalic aldehyde enables products having especially good mechanical properties to be obtained.

If for example use is made of the preferred reactants, i.e. a gamma-collidine and terephthalic aldehyde, the condensation reaction may be schematically represented as follows, at least during the initial stage of reaction:

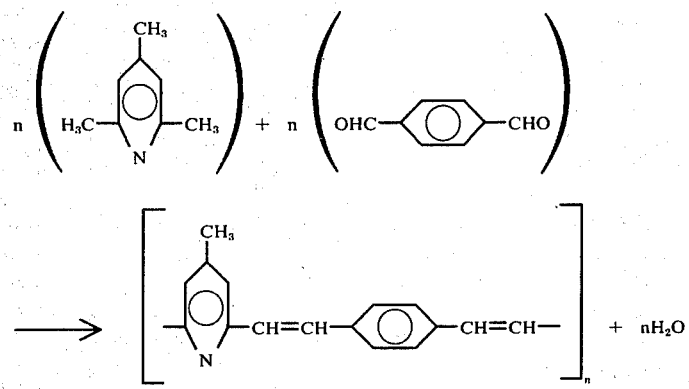

The $CH_3$ substituent in para position with respect to nitrogen on the pyridine cycle in the obtained product may subsequently act as a bridging group with an adjacent chain.

The reactants, i.e. a pyridine comprising at least three methyl groups or, more specifically, gamma-collidine, and the aromatic dialdehyde, can be used in substantially equimolar proportions. However, it may also be preferable to use an excess of the substituted pyridine which is added at the start of the reaction or in the course of it. This excess then also acts as a solvent for the obtained polycondensate and enables the viscosity of the latter, when it has reached a given degree of polycondensation, to be reduced. For a similar purpose, the condensation reaction can be effected in the presence of a third substance acting as a solvent. In this respect there may be mentioned N-methylpyrrolidone. Furthermore, for adjusting the degree of cross-linking of the products, it may be advantageous to effect the reaction in the presence of a monofunctional aldehyde, such as benzoic aldehyde, which is preferably used in replacement of a part of the dialdehyde.

Advantageously the reaction is effected by heating a mixture of the reactants to a temperature ranging from about 150° to about 220° C and, most often, to the boiling temperature of the mixture under the pressure of operation and, preferably, in the presence of a catalyst capable of promoting the condensation between a carbonyl group of the dialdehyde and a methyl substituent of the trimethyl-pyridine. This heating is continued until formation of a viscous liquid, the time necessary for the reaction being dependent on the desired viscosity, the nature of the starting material and the nature and the amount of catalyst.

Moreover, the operation is advantageously carried out under inert atmosphere in order to protect the reactants against oxidation by air. As to the pressure, atmospheric pressure is generally sufficient but it is frequently preferred to apply a light superatmospheric pressure in order to increase the temperature of the reaction.

When the condensation is carried out under a fixed pressure, in particular atmospheric pressure, it is noted that the boiling temperature of the reaction mixture and, thus, the temperature of the reaction itself decreased progressively as the reaction proceeds owing to the formation of water by condensation. It is thus possible to increase the boiling temperature and to speed up in this way the reaction by removing water, as it is formed, by azeotropic distillation using an excess of collidine.

Another way of increasing the reaction temperature is to operate under a slight positive pressure, thus giving the possibility of raising the boiling temperature without having to remove the water of condensation. It has been noted that the presence of this water in a prepolymer does not impede the subsequent use thereof and is not harmful as far as the resin properties after the setting are concerned.

Moreover, the operations are advantageously carried out under an inert atmosphere to protect the reactants against an oxidation by air.

As to the catalyst, many various substances can be used for this purpose and in particular certain acids such as sulphuric, hydrochloric or p-toluene-sulfonic acid, bases such as hydroxides of alkali or alkali-earth metals or of quaternary ammonium, or salts such as zinc chloride or aluminum chloride. The reaction can also be accelerated by certain substances such as methyl iodide, methyl sulfate, benzyl chloride etc., capable of forming with the pyridic base quaternary ammonium derivatives, such substances being usable in catalytic amounts or higher proportions. The use of such catalysts is not indispensable but it reduces the time required for the reaction. The amount is e.g. of 0.1 to 10 mole % with respect to the aromatic dialdehyde.

Addition of a dehydrating agent such as acetic anhydride can also promote the reaction and its action can be sufficient to render superfluous the incorporation of a catalyst.

As aforesaid, the polycondensation reaction between a pyridine comprising at least three methyl groups and an aromatic dialdehyde is readily controllable, particularly upon the preferred use of gamma-collidine. This is the more surprising in the light of prior teachings, as a consideration of the formula of gamma-collidine bearing three reacting methyl groups would, on the contrary, suggest the probability of an immediate cross-linking with the dialdehyde, even more rapid than in the case of 2,6-lutidine. In the process according to the invention, the discontinuation of heating is sufficient to interrupt the reaction, as soon as the resin has reached the desired viscosity for the subsequent use thereof. Nevertheless the polycondensation reaction is sufficiently fast for a commercial use thereof. The optimal reaction time is usually of about 1 to 2 hours. An examination of the product shows that the condensation has brought into play substantially equimolar proportions of collidine and dialdehyde, even when operating in the presence of an excess of collidine, the latter then acting as a solvent for the prepolymer.

The resins or prepolymers obtained according to the invention, can be stored at room temperature until subsequent use thereof, without any continuation of the polycondensation reaction. Their formula is characterised by the presence of units of the type

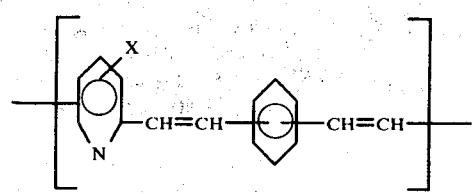

in which X stands for a unit of the same type or a methyl substituent. Preferably the unit under consideration is a derivative of gamma-collidine.

These polymers, which are obtained by polycondensation of a mixture of a pyridine comprising at least 3 methyl groups and an aromatic dialdehyde under the aforesaid conditions, can be directly recovered in the form of viscous liquids of more or less dark brown color, soluble in solvents such as N-methyl-pyrrolidone, dimethylformamide, dimethylacetamide, nitrobenzene, tetrachloroethane, pyridine, meta-cresol, benzonitrile, etc. The prepolymers are also soluble in even more conventional organic solvents, such as ketones, e.g. methylethylketone, cyclohexanone, halogenated derivatives such as tetrachloroethane, ethers such as tetrahydrofuran or dioxane, provided that a very small amount (about 0.1%) of concentrated ammonia is added thereto. The prepolymers can also be collected in a solid, though still meltable, form which is soluble in solvents of the disclosed types e.g. N-methyl-pyrrolidone, and is thermosetting, either upon continuing the polycondensation reaction up to the setting of the reacting mixture, or upon precipitation of fractions having a relatively advanced degree of polycondensation from the viscous liquid. In such a case, the precipitation is advantageously effected by adding an ether or an alcohol of low molecular weight, such as ethyl ether, methanol, ethanol, or another organic liquid which does not dissolve the prepolymer. While the light fractions having a relatively low degree of polycondensation remain in solution, it is possible to recover the precipitated prepolymer in the form of a powdered solid having a more or less pronounced yellow color.

The prepolymers can be used according to various conventional techniques applicable to thermosetting resins. Powdered prepolymers are especially adapted for shaping by pressure-molding, but they can also be dissolved in a solvent or molten.

In all cases, the propolymer is advantageously set by a thermal treatment at a temperature of about 200° to 300° C. Finally there is obtained a non-fusible and non-soluble polymer. Said polymer has a remarkable thermal stability. It can withstand temperature of about 250° C during extended periods without any substantial decrease of its mechanical properties. At 300° C, said properties persist during several tens of hours.

The products obtained according to the invention are suitable for many uses which require both good mechanical properties and the withstanding thereof at high temperatures. However the invention aims more specifically at the use of said products for the forming of composite materials, including laminates which can be obtained in a conventional way by impregnation of fibrous materials with a thermosetting resin which is subsequently subjected to a thermosetting treatment under pressure.

The use of the products according to the invention in the aforesaid context offers numerous advantages.

Thus the impregnation of fibrous materials, such as inorganic and/or refraction filler materials, may be effected directly by the prepolymer obtained in the form of a viscous liquid.

Since the solvent can be evaporated at temperatures substantially lower than those required for the thermosetting of the prepolymer, it is possible to readily provide, under relatively low pressures, essentially non-porous composites. The fibers are then embedded in the polymer material.

Laminated compounds having especially good mechanical properties will be obtained when using the polymers of the invention in combination with carbon fibers. It has been found advantageous to use a method of manufacturing comprising several stages, wherein prepolymer-impregnated fibers are dried at a temperature in the range of 100° to 150° C for removing the possible excess of collidine, then shaped and progressively heated to a temperature of about 200° C at which the molding pressure is progessively applied before raising the temperature above 220° C in order to insure a complete setting The maintaining of the temperature at a level of about 200° C promotes the extension of polymer chains and the improvement of the properties of the final product.

The invention will be further disclosed in connection with specific examples of various embodiments thereof.

EXAMPLE 1

In a flask of 100 ml, swept by a stream of inert gas and provided with a stirrer, a thermometer and a reflux cooler, there is introduced 10.73 g of terephthalic dialdehyde (0.08 mole) and 12 ml (or 11 g) of gamma-collidine (0.09 mole), corresponding to an excess of about 15% of collidine with respect to the equimolar proportion. After complete dissolution which occurs at about 60° C, there is added 0.2 ml (about 0.002 mole), that is about 2.5 moles % relative to dialdehyde, of trifluoromethane-sulfonic acid acting as a catalyst. The mixture is heated to reflux during two hours. The initial boiling temperature (195° C) slowly changes to 165°–170° C owing to the formation of water in the course of the condensation. It is possible to raise the temperature by distillation, thus accelerating the process. However the existence of a heterogeneous heterogenous character due to the presence of water does not affect the processing conditions of the resin.

There is obtained after cooling a prepolymer in the form of a viscous liquid having a dark brown reddish color.

A non-solvent liquid such as ethyl ether or methanol is added to the liquid prepolymer. This causes the precipitation of the prepolymer, which is obtained as a powder of pronounced yellow color.

This powder is soluble in aprotic solvents. It has the following properties:

softening: about 80° C
inherent viscosity: 0.05 dl/g (0.5% solution in N-methylpyrrolidone, measured at 30° C)
analysis: 81.0% of C, 5.9% N, 5.2% H (that is an atomic ratio C/N = 16.01, corresponding to a condensation mole for mole of dialdehyde and collidine).

This powder can be molded and hardened by progressive application of a pressure of 50 kg/cm² at 200° C, then at 250° C. There are thus obtained plates of non-fusible and non-soluble polymers of very low porosity and having the following properties:

density: about 1.20
linear expansion coefficient: $6.3 \times 10^{-5}$/° C
flexure breaking strength: 8–10 kg/mn² (at 20° C) 5–8 kg/mn² (at 250° C)

The results of elementary analysis are very like those for the prepolymer, which confirm that the hardening process takes place without any release of volatile materials.

The thermal stability of the polymer is demonstrated by thermogravimetric analysis, showing an insipient degradation only at about 300° C, under inert atmosphere or in air.

EXAMPLE 2

For preparing a resin adapted to preimpregnation of fibers, there is prepared a viscous liquid prepolymer as in example 1 and it has added thereto, before cooling, 10 ml of gamma-collidine, so that the viscosity can be adjusted at a suitable value.

In the present example, the prepolymer is used for a production of composite laminated materials based on carbon fibers and, more specifically, continuous carbon fibers having a high strength and a treated surface, e.g. the products sold under the trademark "HT.5" by Courtaulds.

Carbon-fiber tows are impregnated with the liquid resin of the type obtained above, after dilution with collidine. At this stage it is advisable to have an impregnation rate of 70 to 75 % by weight, said rate indicating the weight of liquid resin relative to the preimpregnation material.

The major portion of the excess of collidine is driven out by a processing at 100° C of long duration (1.5 to 2 hours). The preimpregnate is then dry but sufficiently flexible for handling. It is sliced in plies (or strata) from which the removal of volatile materials is continued at 150° C during three hours. The impregnation rate is then of only about 50% and the proportion of volatile materials which remain after molding is only of 3 to 5% (measured by the loss of weight of a sample of the preimpregnated material after processing at 250° C during 20 minutes).

The following molding cycle is then applied to the preimpregnate:

raising the temperature to 200° C in 10 minutes, without pressure;
holding at 200° C during 10 to 30 minutes (according to the impregnation rate and the content of volatile materials);
progressive application of pressure at 200° C, up to 50 kg/cm²;
holding at 200° C under pressure during 3 hours;
raising the temperature to 250° C, under constant pressure in 15 minutes;
holding at 250° C during 2 hours under pressure;
release of pressure;
cooling and unmolding.

This technique provides plates of laminated material having an undirectional reinforcement, the density of which is of about 1.5 and the porosity of about 1 to 2 % when the proportion of fibers (in volume) is adjusted to an especially favourable value: 55 %.

The cohesion between the binder and the substrate as well as the breaking strength of the composite material are estimated respectively by measuring the shearing and flexure strengths at various temperatures, with and without annealing. Most often the break occurs without apparent delimination of plies. The obtained results are as follows:

| | without post-treatment | after treatment 16 hr, 250° C | after aging 1000 hrs, 250° C |
|---|---|---|---|
| Flexure 20° C | 130 | 110 | 110 |
| strength 250° C | 80 | 110 | 110 |
| (kg/mm²) 300° C | 80 | 90 | — |
| Shearing 20° C | 8.5 | 8.0 | 7.5 |
| strength 250° C | 5.5 | 6.5 | 6.0 |
| (kg/mm²) 300° C | 5.0 | 5.0 | — |

Fiber proportion in volume: 55 %
vacuum : 2 %
bulk density: 1.5

EXAMPLE 3

The condensation of gamma-collidine and terephthalic aldehyde is effected under the same conditions as in Example 1, but using as a catalyst 0.2 ml (about 0.004 mole) sulphuric acid, that is 4.5 moles % relative to the equimolar proportion of each reactant. After 1 hour boiling at a temperature between 185° and 177° C, there is obtained a liquid resin providing 45% of dry product if subjected to isothermic conditions at 250° C in order to eliminate volatile substances.

This prepolymer may be characterized by its chromatogram obtained by elution on polystyrene gel of a solution of resin in tetrahydrofurane.

After dilution and cooling, the liquid resin is used for production of laminates by the technique disclosed in Example 2.

The mechanical properties of the final polymer are of the same magnitude range as those in Example 2.

EXAMPLE 4

In the same apparatus as in Example 1, there is introduced 10.75 g of terephthalic dialdehyde (0.08 mole) and 21.12 ml of gamma-collidine (0.16 mole). The collidine represents a 100% excess relative to equimolar proportions. After solubilisation there is added 0.2 ml of $CF_3SO_3H$. After 3.5 hrs of heating under reflux, there is obtained about 28 g of resin. This resin is fairly viscous in cold state. By adding ethyl ether, a powdery yellow solid is precipitated, the latter being soluble in N-methyl-pyrrolidone.

The elementary analysis of this product shows an atomic ratio C/N of 16.6. This is a value close to that obtained in Example 1 and corresponding to a condensation mole for mole, although in the present case the collidine has been used with a 100% excess.

Plates of hardened pure resin and laminates obtained from the prepolymer have mechanical and thermal properties very close to those given in Examples 1 and 2.

EXAMPLE 5

Into the same apparatus as in Example 1, are introduced 5.37 g (0.04 mole) of terephthalic dialdehyde and 5.28 ml (0.04 mole) of gamma-collidine having added thereto 20 ml of N-methylpyrrolidone as a solvent for the reaction as well as 0.5 ml of $CF_3SO_3H$. The mixture is brought to boil at a temperature which passes from 185° to 200° C. If the reaction is stopped after 4 hours (after which time the medium is rapidly gelled), there is obtained a highly viscous resin.

Laminates formed with this resin have a flexure-breaking strength of 100 kg/mm² at 20° C and 60 kg/mm² at 250° C.

EXAMPLE 6

In order to limit the degree of cross-linking of the set polymers obtained after the thermal processing of the prepolymer, the condensation is effected with a partial replacement of the dialdehyde by a monofunctional aldehyde.

Into a pyrex container having thick walls and capable of being hermetically sealed, are introduced 5.36 g of terephthalic dialdehyde (0.04 mole), 8.10 ml, (8.49 g) benzoic aldehyde (0.08 mole) and 10.56 m; or 9.68 g of gamma-collidine (0.08 mole). After dissolving the dialdehyde at about 80° C, there is added 0.1 ml (about 0.002 mole) of sulphuric acid acting as a catalyst, that is 2.25 moles % relative to the amount of gamma-collidine. A precipitate of collidine sulphate is formed and is again dissolved upon heating the sealed container to the selected reaction temperature, that is 200° C. After 3 hours there is obtained a resin of suitable viscosity, the slight heterogeneous character of which in cold state does not impede the required operations.

When using carbon fibers "HTS" as a matrix, there is obtained by the method disclosed in Example 1, laminates having a maximum flexure strength at room temperature of 165 kg/mm² for an optimum fiber content of 60% in volume, after a post-treatment of 16 hours at 250° C. Under similar conditions, shearing strength is higher than 9 kg/mm². On the contrary the less pronounced cross-linking of macromolecular chains, even after an extended post-treatment, enables the material to keep a certain thermoplasticity thus limiting to 70 kg/mm² the flexure strength at 250° C.

EXAMPLE 7

Into the same apparatus as in Example 1 are introduced 10.73 g of terephthalic aldehyde (0.08 mole) and 12 ml (11 g, 0.09 mole) of gamma-collidine. After complete dissolving, there is added 7.6 ml (8.2 g, 0.08 mole) of acetic anhydride acting as a dehydration agent. The mixture is then heated to reflux, the temperature changing from 160° to 150° C during the two hours of the test. There is just obtained a highly viscous resin containing, after cooling, a suspension of orange color. This prepolymer has the same setting properties as the one of Example 1.

EXAMPLE 8

Example 3 is repeated but replacing the $SO_4H_2$ catalyst by an equivalent molar proportion (0.3 ml) of hydrochloric acid. After the same reaction time there is obtained a liquid resin having a similar appearance but a less viscous consistence thus providing 10% of dry product (40% after 6 hours boiling).

EXAMPLE 9

Same test, but catalysed by an equivalent molar amount of benzyl chloride:

Dry product content in the resin after one hour synthesis: 27%

EXAMPLE 10

Same test, but catalysed by an equivalent molar amount of potassium cyanide.